United States Patent [19]

Downey

[11] 4,064,094

[45] Dec. 20, 1977

[54] SPRAYABLE-PRESSURE SENSITIVE ADHESIVE COMPOSITION

[75] Inventor: Raymond E. Downey, Akron, Ohio

[73] Assignee: The Goodyear Tire & Rubber Company, Akron, Ohio

[21] Appl. No.: 608,126

[22] Filed: Aug. 27, 1975

Related U.S. Application Data

[63] Continuation of Ser. No. 421,293, Dec. 3, 1973, abandoned.

[51] Int. Cl.$^2$ .......................... C08K 5/05; C08K 5/07; C08L 9/06; C09J 3/14
[52] U.S. Cl. .......................... 260/32.8 A; 260/32.8 R; 260/33.4 R; 260/34.2
[58] Field of Search ...................... 260/32.8 A, 32.8 R, 260/33.4 R, 33.4 PQ, 34.2, 876 B

[56] References Cited

U.S. PATENT DOCUMENTS

| | | | |
|---|---|---|---|
| 3,332,903 | 7/1967 | Kavalir | 260/32.8 A |
| 3,676,202 | 7/1972 | Korpman | 260/876 B |
| 3,776,873 | 12/1973 | Kremer | 260/34.2 |

*Primary Examiner*—Allan Lieberman
*Attorney, Agent, or Firm*—F. W. Brunner; H. C. Young, Jr.

[57] ABSTRACT

A sprayable pressure-sensitive adhesive mixture comprising a dispersion of a thermoplastic hydrocarbon derived resin having a softening point in the range of about 80° C to about 110° C derived from piperylene and 2-methyl-2-butene and a styrene-isoprene-styrene unvulcanized elastomeric block copolymer in a liquid dispersant selected from ketones and alcohols containing about 0 to about 5 weight percent alcohol. The sprayable adhesive mixture enables a method of applying a pressure-sensitive adhesive with attenuated cobwebbing which comprises applying an atomized spray coat under pressure of such an adhesive dispersion onto a substrate and drying the mixture.

3 Claims, No Drawings

SPRAYABLE-PRESSURE SENSITIVE ADHESIVE COMPOSITION

This is a continuation of application Ser. No. 421,293, filed Dec. 3, 1973, now abandoned.

This invention relates to a sprayable pressure-sensitive adhesive mixture and to a method of applying such a pressure-sensitive adhesive mixture to a substrate.

Pressure-sensitive adhesives, for many commercial applications, are applied to various substrates by spraying or by simply coating a substrate surface with a pressure-sensitive adhesive dissolved in a suitable solvent.

However, substantial difficulties have been experienced in attempting to apply atomized adhesive spray coats of mixtures of piperylene/2-methyl-2-butene backboned resin and styrene-isoprene-styrene unvulcanized block copolymer with a suitable solvent. Considerable cobwebbing is typically experienced which is evidenced by excessive airborn cobweb-like filamentary threads of the adhesive and which results in damaging the intended smooth surface of the adhesive spray coat. The lightweight airborn cobwebs also tend to objectionably stick and adhere to other surrounding surfaces as a contaminant.

Therefore, it is an object of this invention to provide an improved sprayable pressure-sensitive adhesive mixture which can be applied to a substrate surface as an atomized spray mixture.

In accordance with this invention, it has been discovered that a sprayable pressure-sensitive adhesive mixture comprises a dispersion of about 30 to about 70 weight percent of a thermoplastic hydrocarbon derived resin having a softening point in the range of about 80° C to about 110° C. comprising about 35 to about 65 parts by weight units derived from piperylene and correspondingly about 65 to about 35 parts by weight units derived from 2-methyl-2-butene, and correspondingly about 70 to about 30 weight percent of a styrene-isoprene-styrene unvulcanized elastomeric block copolymer, based on the resin and block copolymer, in about 80 to about 95 weight percent, based on the total mixture, of a liquid dispersant selected from ketones and alcohols and their mixtures containing about 0 to about 5 weight percent alcohol, where said block copolymer comprises blocks consisting of about 10 to about 50 weight percent styrene polymer blocks having an average molecular weight of about 2,000 to about 100,000 and a glass transition temperature above 25° C and isoprene polymer blocks having an average molecular weight of about 25,000 to about 1 million and a glass transition temperature below about 10° C, said copolymer having an ultimate tensile strength at 25° C in excess of 200 pounds per square inch.

In further accordance with this invention, it has been discovered that a method of applying a pressure-sensitive adhesive comprises applying an atomized spray coat of such an adhesive mixture dispersion onto a substrate and drying the mixture.

In the preferred practice of this invention, the thermoplastic hydrocarbon derived resin has a softening point in the range of about 90° C to about 105° C and is prepared by polymerizing the monomers in the presence of particulate anhydrous aluminum chloride. In the further practice of this invention, about 82 to about 90 weight percent of the volatile liquid organic dispersant is used and selected from liquid ketones having from 3 to 6 carbon atoms and liquid alcohols having from 1 to 5 carbon atoms. It is generally preferable to use a mixture of ketone and alcohol containing about 1 to about 3 weight percent of the alcohol. It is preferred that the said unvulcanized elastomeric block copolymer comprises polystyrene blocks having an average molecular weight of about 5,000 to about 30,000 with a total styrene block being about 12 to about 30 weight percent of the copolymer and the isoprene polymer block having an average molecular weight of about 50,000 to about 150,000.

Surprisingly, the applicants required dispersion, which has a generally white milky appearance, substantially attenuates or essentially stops cobwebbing from an atomized adhesive mixture as compared to a similar composition utilizing a solvent solution. Uniquely, the applicants required composition exhibits an essentially non-Newtonian flow by showing a reduction in its viscosity under shear. Thus, its effective viscosity actually changes as it passes from the storage portion of a spray applicator through its spray nozzle. The actual mechanism of how the invention attenuates cobweb formation is not thoroughly understood although a combination of the dispersion requirement and non-Newtonian flow characteristics of the mixture are believed to play an important part.

Various ketone or ketone-alcohol dispersants or non-solvents can be used for the pressure-sensitive adhesive composition of this invention. Representative of such non-solvents are methyl ethyl ketone, methyl isobutyl ketone and diisobutyl ketone as well as mixtures of such ketones with up to about 5, preferably up to about 3, weight percent of liquid alcohols based on the ketone-alcohol mixture, such as methanol, ethanol, ethanol and isopropanol. Generally, methyl ethyl ketone and ethanol are preferred.

The dispersion of this invention is generally prepared by mixing the adhesive composition with the liquid dispersant at a temperature in the range of about 15° C to about 30° C, preferably about 20° C. to about 25° C., with the aid of a high shear mixer if necessary to obtain the dispersion. The dispersion is generally indicated by a milky-white or cloudy appearance. If the mixture becomes substantially clear, then an unwanted solution is indicated as opposed to the required dispersion.

A satisfactory coating of the adhesive mixture of this invention typically has a dried thickness in the range of from about 0.3 to about 2 and preferably from about 0.5 to about 1 mils.

The pressure-sensitive adhesive of this invention can be conveniently applied as an atomized mixture under pressure, such as application from an aerosol can, utilizing various compressive gasses. For example, typical materials utilized as propellants are the well-known halogenated hydrocarbons, such as those selected from fluoro- and chloro- substituted methane and ethane. Air, nitrogen and other inert gases can be used also. Preferred halogenated hydrocarbons in the well-known propellants which typically have a vapor pressure in the range of about 15 to about 100 pounds per square inch at about 21° C, a low toxicity, a chemical inertness, low flammability and good compatibility with solvent systems. Representative of such halogenated hydrocarbons are dichlorodifluoromethane, dichlorofluoromethane, chlorotrifluoromethane, tetrafluoromethane, dichlorofluoromethane, chlorodifluoromethane trifluoromethane, trichlorotrifluoroethane, dichlorotetrafluoroethane, chloropentafluoroethane and hexafluoroethane. Generally, dichlorodifluoromethane is preferred.

Typically, the adhesive mixture dispersion can be applied as an atomized spray onto a substrate surface at a distance of about 1 to about 3 feet, at a temperature in the range of about 15° C, preferably about 20° C to about 30° C, under a pressure of about 20 to about 40 pounds per square inch gauge (psig) through a nozzle orifice having a diameter of about 10 to about 35 mils and preferably about 18 to about 30 mils. The adhesive mixture coat can then be simply dried in the open atmosphere if desired or in a controlled drying apparatus if desired, at a temperature in the range of about 20° C to about 100° C over a period of time ranging from a few minutes to at least several hours or more.

The required thermoplastic hydrocarbon derived resin for this invention can be prepared, for example by polymerizing a mixture comprising from about 20 to about 75 weight percent of piperylene and from about 80 to about 25 weight percent of 2-methyl-2-butene in the presence of an anhydrous particulate aluminum chloride catalyst, at a temperature of from 0° C to about 50° C. It is usually preferred to conduct the polymerization in an inert volatile organic solvent using aluminum chloride having a mesh size of from about 50 to about 200 U.S. Sieve size. The resin polymers can be modified by containing up to about 25 percent by weight units derived from piperylene dimers, piperylene trimers, and other unsaturated hydrocarbons containing from 5 to 6 carbon atoms such as substituted butenes such as 2-methyl-1-butene, 2,3-di-methyl-1-butene, 2,3-dimethyl-2-butene, 3,3-dimethyl-1-butene; the pentenes and substituted pentenes such as 1-pentene, 2-pentene, 2-methyl-1-pentene, 2-methyl-2-pentene, 3-methyl-2-pentene, 4-methyl-1-pentene, 4-methyl-2-pentene, the hexenes such as 2-hexene, diolefins such as isoprene, and cyclic unsaturated hydrocarbons such as cyclopentene, cyclohexene and 1,3-cyclopentadiene.

The unvulcanized elastomeric block copolymer used in this invention comprises nonelastomeric terminal styrene polymer blocks and internal elastomeric isoprene polymer blocks. The characteristics of the internal or middle block, which is elastomeric, may be that expressed in ASTM Special Technical Bulletin No. 184 as follows: "A substance that can be stretched at room termperature to at least twice its original length and, after having been stretched and the stress removed, returns with force to approximately its original length in a short time.".

The terminal nonelastomeric blocks constitute polymeric blocks which do not meet this definition. Furthermore, the difference between glass transition temperatures of the end blocks and the middle block should be at least 40° C. and preferably at least 100° C.

Typically, the unvulcanized elastomeric copolymers can be prepared by first polymerizing styrene with a lithium based initiator. A suitable lithium based initiator is, for example, lithium metal, alkyl lithium compounds, lithium hydrocarbyls and organo lithium amides. The alkyl lithium compounds are preferred. Particularly preferred alkyl lithium compounds are branched chain, preferably secondary alkyl lithiums. Such alkyl lithium compounds especially include secondary butyl lithium, isobutyl lithium, isoamyl lithium and secondary amyl lithium.

After polymerizing this monomer to an average molecular weight of from about 2,000 to about 100,000, and preferably from about 5,000 to about 30,000, isoprene and additional amounts of styrene are added to the polymerization mixture.

The polymerization then continues to provide an elastomeric middle block polymer of isoprene having an average molecular weight of from about 25,000 to about 1,000,000, and more preferably between about 50,000 and about 500,000, followed by a non-elastomeric block polymer of styrene.

Typically, the preparation of the elastomeric block copolymer is made by polymerizing the monomers at temperatures in the order of about −20° C. to about 100° C, preferably between about 20° C. and about 65° C. in an inert hydrocarbon solvent such as an alpha olefin or aromatic hydrocarbon. Typically inert hydrocarbon solvents are aliphatic hydrocarbons (including cycloaliphatic) such as cyclohexane and a typical aromatic hydrocarbon is benzene. Usually the amount of initiator should be maintained as low as possible, but may be varied over a relatively wide range such as from about 1 to about 200 parts per million, based on the weight of the monomers present.

The following examples further illustrate the invention. The parts and percentages are by weight unless otherwise indicated.

EXAMPLE I (Preparation of Thermoplastic Resin)

A thermoplastic tackifying resin was prepared by the following method:

To a reactor was charged 200 parts of heptane and 6 parts of anhydrous aluminum chloride at a temperature of about 25° C. While continuously stirring the mixture, 400 parts of a hydrocarbon mixture containing unsaturated hydrocarbons was slowly added to the reactor over a period of about 90 minutes. The temperature of the reaction was thereafter maintained in a range of about 25° C to about 30° C for about 60 minutes. The hydrocarbon mixture had the following composition:

| Component | Percent |
|---|---|
| 2-pentene | 5.1 |
| 2-methyl-2-butene | 32.9 |
| Isoprene | 3.1 |
| 1,3-pentadiene (piperylene) | 27.5 |
| 2,3-dimethyl-1-butene | 2.1 |
| 4-methyl-2-pentene | 19.4 |
| Unsaturated hydrocarbons containing 5 to 6 carbon atoms | 10.5 |
| | 100.6 |

After this polymerization, 25 parts of water, 8 parts of particulate hydrated calcium hydroxide and 8 parts of Attapulgus clay were added to the polymerizate. Agitation was provided to suspend the hydrated calcium hydroxide at about 90° C. and continued for about 120 minutes. The mixture was then filtered to remove the insoluble catalyst residue, excess calium compound and clay. The filtrate was then steam distilled to a pot temperature of about 235° C. The resulting residual molten resin was poured from the reactor onto an aluminum tray and cooled to about 25° C. to form 173 parts of a hard brittle resin having a pale yellow color, and having a softening point, according to ASTM Method E28-58T of 95° C.

EXAMPLE II (Preparation of Block Copolymer)

A polystyrene-polyisoprene-polystyrene unvulcanized elastomeric block copolymer was prepared by the following method:

A solution was prepared consisting of 2 grams of styrene in a 20 milliliter solution of benzene. The solution was run through silica gel at about 25° C. to remove trace amounts of water and then sparged with dry nitrogen for about 30 seconds to remove trace amounts of air.

To the solution was added 0.2 millimoles of secondary butyl lithium in a 0.3 molar heptane solution. The mixture was allowed to polymerize and set aside for about 16 to 18 hours at about 25° C.

A solution was prepared consisting of 16 grams of isoprene and 2 grams of styrene in 80 milliliters of a benzene solution. The solution was run through silica gel at about 25° C. to remove traces of water and purged with dry nitrogen to remove trace amounts of air.

The mixture of isoprene, styrene and benzene was mixed with the original polymerized styrene mixture to the exclusion of air in a reactor. The reactor was sealed and placed in a heated liquid polymerization bath at about 50° C. for about 4 hours until about a 100 percent completion of the polymerization occurred.

The resulting polymer was coagulated with methyl alcohol containing a very small amount of a phenolic antioxidant and dried. The resulting polymer had an intrinsic viscosity of 1.12 in toluene at 30° C. It contained 18 percent by weight units derived from styrene.

A portion of the polymer was molded in the form of dumbbells at 138° C. The dumbbells had a thickness of 0.6 inch, a width of 0.1 inch at its narrow portion and a length of 0.8 inch. The dumbbells were tested on an Instron tester at 25° C. with a crosshead separation speed of 2 inches per minute. The tests indicated that the prepared block copolymer had an ultimate tensile strength of about 250 pounds per square inch at an elongation of 1500 percent.

Analyses indicated that the block copolymer had a molecular weight of about 100,000. Thus, assuming that the terminal polystyrene blocks were of equal molecular weight, the block copolymer comprised terminal polystyrene blocks having molecular weights of about 9000 and internal polyisoprene having a molecular weight of about 82,000.

EXAMPLE III (Adhesive Mixture)

A mixture of piperylene/2-methyl-2-butene tackifying resin prepared according to Example I and a polystyrenepolyisoprene-polystyrene block copolymer, obtainable as Kraton 1107 from The Shell Chemical Company and exemplary or similar to the block copolymer prepared according to the method of Example II was prepared. The block copolymer contained about 12 percent styrene by weight, a glass transition temperature of about −70° C. and a tensile strength of about 1,200 pounds per square inch with an elongation of about 1,300 percent measured at 25° C., according to the method used in Example II. The copolymer had an intrinsic viscosity of 1.1 as measured in toluene at 30° C.

The mixture of tackifying resin and block copolymer was prepared by the following method:

One part of an amine type of non-staining antioxidant was dissolved in 300 parts of a hydrocarbon solvent at about 25° C. The hydrocarbon solvent consisted of 20 parts of toluene and 80 parts of hexane. This mixture of hydrocarbons was used for the solvent to provide an optimum viscosity for sample preparation. To the solvent mixture was added 100 parts of the block copolymer of polystyrene-polyisoprene-polystyrene and 100 parts of a tackifying resin. The mixture was agitated by rolling in a container at about 25° C. for about 8 to 12 hours.

The mixture was coated onto a polyester film having a 1 mil thickness (obtained as Mylar from The E I duPont De Nemours & Company) with a doctor blade to provide a 1 mil coating on the polyester film. The coating was allowed to partially dry at about 25° C. for about 2 minutes. The polyester film with the coat thereon was then placed in a hot air oven having a temperature of 70° C. for about 5 minutes. The sample was removed from the hot air oven and allowed to cool to about 25° C. and, for protective purposes, a release paper was placed over the coating. The release paper was a clay coated sheet of paper with a silicone release agent overcoat. The sample was cut into strips 1 inch wide for testing purposes. The results of 180° peel strength and shear strength tests both on a freshly prepared sample and on a sample allowed to age at 70° C. for about 5 days are shown in the following table:

TABLE 1

| Iodine No. (1) | 180° Peel Strength (lbs) | | Shear Strength | |
|---|---|---|---|---|
| | Fresh Sample | After Aging | Fresh Sample | After Aging |
| 79–110 | 3.5 | 4.0 | No Failure | No Failure |

(1) According to ASTM Method D-1959-61.

EXAMPLE IV

Samples 1-4 were prepared and tested according to the method used for Example III, except that various amounts of the thermoplastic hydrocarbon resin were used with 100 parts of the block copolymer. In Sample 2, 20 parts of mineral oil were also added. The adhesive of Sample 2 was suitable as a hot melt pressure sensitive adhesive.

TABLE 2

| Sample No. | Resin Parts | 180° Peel Strength (lbs) | Sheer Strength |
|---|---|---|---|
| 1 | 60 | 2.8 | No failure |
| 2 | 100 | 2.6 | 48 hours |
| 3 | 150 | 4.8 | No failure |
| 4 | 200 | 3.8 | No failure |

In these examples the 180° peel strength tests were conducted according to Method PSTC-1, revised in April of 1966, of the Pressure Sensitive Tape Council. This method is found in the Fifth Edition of "TEST METHODS FOR PRESSURE SENSITIVE TAPES" developed by the Pressure Sensitive Tape Council, 1201 Waukegan Road, Glenview, Ill. This test measures the average pull value required to peel the adhesive from the substrate at 180° angle in pounds per one inch width of the test sample. The sheer strength was measured in this example according to the method described as PST-7 of the Pressure Sensitive Tape Council. In particular, it was measured by applying a 1,000 gram weight to the sample and measuring the time required for the tape to separate from the substrate. For the purposes of this example a time of about 5 days was used.

All of the samples exhibited peel strength to be suitable as a pressure sensitive adhesive. In Samples 1, 3 and 4 the shear strength test indicated no failure after about 5 days. In Sample 2, the shear strength test indicated a failure after 48 hours for the hot melt pressure sensitive adhesive. Such a shear strength for the adhesive is adequate and suitable for a pressure sensitive adhesive.

In the practice of this invention, various amounts of the tackifying resin can be mixed with the copolymer to provide the adhesive composition, depending somewhat upon its intended use. For example, useful adhesive compositions are prepared by mixing from about 30 to about 250 percent by weight of the tackifying resin with the copolymer. More particularly, in pressure sensitive adhesive applications it is preferred that the tackifying resin comprises from about 30 to about 200 percent by weight of the copolymer.

EXAMPLE V

Two pressure sensitive adhesive compositions were prepared as a mixture of a thermoplastic tackifying resin prepared according to Example I and a polystyrene-polyisoprene-polystyrene unvulcanized elastomeric block copolymer of the type generally described in Example II, obtained as Kraton 1107, and a diluent or dispersant. For convenience, the compositions are identified as composition A and B. For composition A, the diluent was a non-solvent mixture of methyl ethyl ketone and ethanol and for composition B, the diluent was a solvent toluene. A recipe for the mixtures A and B is more clearly shown in Table 1:

TABLE 1

| Compound | Parts Comp A | Comp B |
|---|---|---|
| Block copolymer | 100 | 100 |
| Tackifying resin | 100 | 100 |
| Phenolic antioxidant | 1 | 1 |
| Methyl ethyl ketone | 776 | — |
| Ethanol | 24 | — |
| Toluene | — | 800 |

The mixtures were actually prepared by mixing with a high shear mixer to form a 20 weight percent dispersion or solution of the adhesive mixture. The dispersion had a milky white appearance whereas the solution had a transparent, clear amber color.

Viscosity measurements were made of the mixtures with a Brookfield viscometer, model LVF. The viscosity measurements (centipoises at 25° C.) are shown in Table 2.

TABLE 2

| Measurement | | Viscosity (cps) Composition A | Composition B |
|---|---|---|---|
| No. 2 spindle at | 6 rpm | 500 | 100 |
| | 12 rpm | 300 | 75 |
| | 30 rpm | 160 | 70 |
| | 60 rpm | 100 | 70 |
| No. 1 spindle at | 6 rpm (1) | 100 | 40 |
| | 12 rpm (1) | 72.5 | 30 |
| | 30 rpm (1) | 46 | 28 |
| | 60 rpm (1) | 34 | 28 |

(1) 15% solids instead of 20% solids shown in Table 1.

Thus, the solvent solution indicates a substantially Newtonian behaviour as would be expected of a true solution whereas the dispersion exhibits a non-Newtonian flow characteristic resulting in a reduced viscosity under shear.

The dispersion A and the solution B were then sprayed through a hand held spray gun under a pressure of about 20 to 40 pounds per square inch gauge (psig) with the dichlorodifluoromethane as a propellant through the spray gun's orifice having a diameter of about 0.02 inch onto a substrate surface (at a distance of 18 to 24 inches) and dried to form a pressure-sensitive adhesive coating with a thickness of about one mil.

Two very important observations must be made relating to pressure-sensitive adhesives A and B. The atomized adhesive solution B provided considerable cobwebbing which not only marred the adhesive coat itself but also caused a considerable annoying deposit of the cobwebs on surrounding surfaces. However, the atomized adhesive dispersion A provided essentially no cobwebs to interfere with the spray coat itself or to cause cobwebs to deposit on surrounding surfaces.

While certain representative embodiments and details have been shown for the purpose of illustrating the invention, it will be apparent to those skilled in this art that various changes and modifications may be made therein without departing from the spirit or scope of the invention.

What is claimed is:

1. A sprayable pressure-sensitive adhesive mixture which comprises a dispersion consisting essentially of both (A) about 30 to about 70 weight percent of a thermoplastic hydrocarbon derived resin having a softening point in the range of about 80° C. to about 110° C. comprising about 35 to about 65 parts by weight units derived from piperylene and correspondingly about 65 to about 35 parts by weight units derived from 2-methyl-2-butene, and correspondingly, (B) about 70 to about 30 weight percent of a styrene-isoprene-styrene unvulcanized elastomeric block copolymer, based on resin and block copolymer, in (C) about 80 to about 95 weight percent, based on the total mixture, of a volatile liquid organic dispersant selected from ketones and alcohol/ketone mixtures containing from about 0 to about 5 weight percent alcohol; where said ketones are selected from at least one of the group consisting essentially of methyl ethyl ketone, methyl isobutyl ketone and diisobutyl ketone, where said alcohols are selected from at least one of the group consisting essentially of methanol, ethanol and isopropanol, where said block copolymer comprises blocks consisting of about 10 to about 50 weight percent styrene polymer blocks having an average molecular weight of about 2,000 to about 100,000 and a glass transition temperature of above 25° C., and the isoprene polymer block having an average molecular weight of about 25,000 to about 1 million and a glass transition temperature below about 10° C., with the difference between said transition temperatures being at least about 40° C., said copolymer having an ultimate tensile strength at 25° C., in excess of 200 pounds per square inch, and where said thermoplastic resin is prepared by polymerizing a mixture comprised of about 20 to about 75 weight percent piperylene and correspondingly about 80 to about 25 weight percent 2-methyl-2-butene in the presence of aluminum chloride.

2. The pressure sensitive adhesive mixture of claim 1 where said thermoplastic hydrocarbon derived resin has a softening point in the range of about 90° C to about 105° C, where about 82 to about 90 weight percent volatile liquid organic dispersant is used selected from the group consisting of methyl ethyl ketone, methyl isobutyl ketone, diisobutyl ketone, methanol, ethanol, and isopropanol and where said unvulcanized elastomeric block copolymer comprises polystyrene blocks having an average molecular weight of about 5,000 to about 30,000 with a total styrene block being about 12 to about 30 weight percent of the copolymer and the isoprene polymer block having an average molecular weight of about 50,000 to about 150,000.

3. The pressure sensitive adhesive of claim 1 where said thermoplastic hydrocarbon derived resin is modified by containing up to about 25 weight percent units derived from piperylene dimers, piperylene trimers and other unsaturated hydrocarbons containing 5 to 6 carbon atoms.

* * * * *